(12) United States Patent
Peng et al.

(10) Patent No.: US 12,085,816 B2
(45) Date of Patent: Sep. 10, 2024

(54) DISPLAY PANEL AND METHOD FOR MANUFACTURING SAME

(71) Applicant: TCL CHINA STAR OPTOELECTRONICS TECHNOLOGY CO., LTD., Shenzhen (CN)

(72) Inventors: Bangyin Peng, Shenzhen (CN); Ilgon Kim, Shenzhen (CN); Bai Bai, Shenzhen (CN); Yanjun Song, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 629 days.

(21) Appl. No.: 17/047,646

(22) PCT Filed: Jun. 8, 2020

(86) PCT No.: PCT/CN2020/094846
§ 371 (c)(1),
(2) Date: Oct. 14, 2020

(87) PCT Pub. No.: WO2021/208217
PCT Pub. Date: Oct. 21, 2021

(65) Prior Publication Data
US 2023/0130081 A1 Apr. 27, 2023

(30) Foreign Application Priority Data
Apr. 14, 2020 (CN) .......................... 202010292367.0

(51) Int. Cl.
*G02F 1/1345* (2006.01)
*G02F 1/1339* (2006.01)
*G09G 3/36* (2006.01)

(52) U.S. Cl.
CPC ........ *G02F 1/13452* (2013.01); *G02F 1/1339* (2013.01); *G02F 2202/28* (2013.01); *G09G 3/36* (2013.01); *G09G 2300/0408* (2013.01)

(58) Field of Classification Search
CPC ............. G02F 1/13452; G02F 1/13456; G02F 1/13458; G02F 1/1339
See application file for complete search history.

(56) References Cited

U.S. PATENT DOCUMENTS

2002/0163614 A1* 11/2002 Hinata .................. G02F 1/1345
349/139
2013/0340934 A1 12/2013 Chen
(Continued)

FOREIGN PATENT DOCUMENTS

CN 102516916 A 6/2012
CN 102736302 A 10/2012
(Continued)

OTHER PUBLICATIONS

International Search Report in International application No. PCT/CN2020/094846, mailed on Dec. 29, 2020.
(Continued)

*Primary Examiner* — Dung T Nguyen
(74) *Attorney, Agent, or Firm* — PV IP PC; Wei Te Chung

(57) ABSTRACT

The present application provides a display panel and a method for manufacturing the display panel. The display panel includes a driving circuit layer, a liquid crystal layer, and a frame glue layer. The driving circuit layer includes a driving unit sub-layer and a wire sub-layer; the wire sub-layer includes a plurality of metal wires disposed parallel to each other, a hollow section is disposed between any adjacent two metal wires, and in each of the hollow sections, a width of the hollow section near a boundary between the
(Continued)

frame glue layer and the liquid crystal layer is greater than or equal to a width of any other hollow sections.

15 Claims, 2 Drawing Sheets

(56) References Cited

U.S. PATENT DOCUMENTS

| | | | |
|---|---|---|---|
| 2015/0212353 A1* | 7/2015 | Fujiwara | H01L 27/124 349/139 |
| 2019/0250477 A1* | 8/2019 | Yin | G02F 1/136286 |

FOREIGN PATENT DOCUMENTS

| CN | 103048828 A | 4/2013 |
|---|---|---|
| CN | 103173159 A | 6/2013 |
| CN | 105388671 A | 3/2016 |
| CN | 108267899 A | 7/2018 |
| CN | 108519699 A | 9/2018 |
| CN | 208737165 U | 4/2019 |
| CN | 110007527 A | 7/2019 |
| CN | 110673382 A | 1/2020 |
| KR | 20140101219 A | 8/2014 |

OTHER PUBLICATIONS

Written Opinion of the International Search Authority in International application No. PCT/CN2020/094846, mailed on Dec. 29, 2020.
Chinese Office Action issued in corresponding Chinese Patent Application No. 202010292367.0 dated Nov. 4, 2020, pp. 1-8.
Notification to Grant Patent Right for Invention issued in corresponding Chinese Patent Application No. 202010292367.0 dated Jan. 11, 2022, pp. 1-4.

* cited by examiner providing a first substrate and forming a driving circuit layer on the first substrate, wherein the driving circuit layer comprises a driving unit sub-layer disposed in the packaging region and a wire sub-layer connected to the driving unit sub-layer and extending to the frame glue region; the wire sub-layer comprises a plurality of metal wires disposed parallel to each other, hollow sections are disposed between any two adjacent metal wires ⸺ S10 providing a second substrate, and forming a frame glue layer adjacent to the packaging region on the wire sub-layer, wherein the second substrate is coupled to and connected to the first substrate by the sealant, a liquid crystal layer disposed between the first substrate and the second substrate and corresponding to the packaging region; wherein in the hollow sections, a width of each of the hollow sections near a boundary between the frame glue layer and the liquid crystal layer is greater than or equal to a width of each of the other hollow sections ⸺ S20

FIG. 3

DISPLAY PANEL AND METHOD FOR MANUFACTURING SAME

BACKGROUND OF INVENTION

This application is a Notional Phase of PCT Patent Application No. PCT/CN2020/094846 having international filing date of Jun. 8, 2020, which claims priority to Chinese Patent Application with the application No. 202010292367.0 filed on Apr. 14, 2020 with the National Intellectual Property Administration, the disclosure of which is incorporated by reference in the present application in its entirety.

Field of Invention

The present application relates to the field of display technology, and particularly to a display panel and a method for manufacturing the display panel.

Description of Prior Art

Large-sized LCD TVs are becoming more and more popular with improvement of people's living standards and development of display technology. At a same time, high resolution, high contrast, high refresh rate, and ultra-narrow bezels have become highlights and selling points of TV manufacturers. In particular, a current market of large-sized LCD panels has been totally transformed from 4K 60 HZ to 8K 120 HZ. In a case of extremely high resolution and high refresh frequency while also maintaining a feature of narrow borders, there are greater difficulties and challenges placed on designing and manufacturing of TFT LCD panels, as well as material demands.

Comparing with 4 K 60 HZ, a driving circuit such as gate driver on array (GOA) for 8 K 120 HZ requires a greater amount of wires such as clock signal lines (CK) and a smaller resistance impedance to reduce heat on wire on array (WOA) caused by high-frequency operation. This requires a wider GOA circuit and a wider CK wire, making it impossible to meet the needs of narrow borders.

In an existing design, a common method to reduce the impedance of the CK wires is to increase line width of the CK wires and/or reduce line spacing between the CK wires, while applying a frame glue on the CK wires (on bus line). As wire spacing of such structure is too narrow, that is, a metal hollowing rate is lower, the frame glue sealing liquid crystals is not completely cured when cured by ultraviolet light, resulting in liquid crystal pollution or poor adhesion of the whole frame glue, further leading to problems in product quality or performance.

SUMMARY OF INVENTION

The present application provides a display device and a method for manufacturing the display panel to solve a problem of the existing structure where a frame glue is disposed in the CK wires on bus line and the wire spacing is too small so that the frame glue for sealing liquid crystal is not completely cured when cured by ultraviolet light, resulting in liquid crystal pollution or poor adhesion of the whole frame glue.

To solve the above problem, the present application provides the scheme as below:

The present application provides a display panel comprising a packaging region and a frame glue region adjacent to the packaging region, wherein the display panel comprises:

a first substrate and a second substrate disposed opposite to each other;

a driving circuit layer disposed at a side of the first substrate near the second substrate, wherein the driving circuit layer comprises a driving unit sub-layer disposed in the packaging region and a wire sub-layer connected to the driving unit sub-layer and extending to the frame glue region;

a liquid crystal layer disposed between the first substrate and the second substrate and corresponding to the packaging region; and a frame glue layer disposed between the wire sub-layer and the second substrate and adjacent to the packaging region, wherein the wire sub-layer comprises a plurality of metal wires disposed parallel to each other, hollow sections are disposed between any two adjacent metal wires, in the hollow sections, a width of each of the hollow sections near a boundary between the frame glue layer and the liquid crystal layer is greater than or equal to a width of each of the other hollow sections.

In the display panel of the present application, wherein the hollow sections are divided into at least two hollow groups, each of the hollow groups comprises at least one of the hollow sections, in any two of the hollow groups, a width of any one of the hollow sections in one hollow group near the boundary between the frame glue layer and the liquid crystal layer is greater than a width of any one of the hollow sections in another hollow group far away from the boundary between the frame glue layer and the liquid crystal layer.

In the display panel of the present application, wherein in any one of the hollow groups comprising at least two hollow sections, widths of the hollow sections are the same.

In the display panel of the present application, wherein a number of the hollow groups is two, a width of each of the hollow sections in one of the hollow groups near the boundary between the frame glue layer and the liquid crystal layer is equal to a width of each of the metal wires.

In the display panel of the present application, wherein the hollow group near the boundary between the frame glue layer and the liquid crystal layer comprises one hollow section, and two of the metal wires disposed at two sides of the hollow section are disposed in the packaging region and in the frame glue region, respectively.

In the display panel of the present application, wherein a number of the hollow groups is four, a width of each of the hollow sections in one of the hollow groups near the boundary between the frame glue layer and the liquid crystal layer is greater than or equal to 40% of a width of each of the metal wires.

In the display panel of the present application, wherein in any adjacent two of the hollow sections, a width of one of hollow sections near the boundary between the frame glue layer and the liquid crystal layer is greater than a width of another one of the hollow sections far away from the boundary between the frame glue layer and the liquid crystal layer.

In the display panel of the present application, wherein a width of any one of the hollow sections is greater than or equal to 10% of a width of each of the metal wires.

The present application providing another display panel, comprising a packaging region and a frame glue region adjacent to the packaging region, wherein the display panel comprises:

a first substrate and a second substrate disposed opposite to each other;

a driving circuit layer disposed at a side of the first substrate near the second substrate, wherein the driving circuit layer comprises a driving unit sub-layer disposed in the packaging region and a wire sub-layer connected to the driving unit sub-layer and extending to the frame glue region;

a liquid crystal layer disposed between the first substrate and the second substrate and opposite to the packaging region; and a frame glue layer disposed between the wire sub-layer and the second substrate and adjacent to the packaging region, wherein the wire sub-layer comprises a plurality of metal wires disposed parallel to each other, hollow sections are disposed between any two adjacent metal wires, in the hollow sections, a width of each of the hollow sections near a boundary between the frame glue layer and the liquid crystal layer is greater than or equal to a width of each of the other hollow sections, a width of any one hollow section is greater than or equal to 10% of a width of each of the metal wires.

In the display panel of the present application, wherein the hollow sections are divided into at least two hollow groups, each of the hollow groups comprises at least one of the hollow sections, in any two of the hollow groups, a width of any one of the hollow sections of one hollow group near the boundary between the frame glue layer and the liquid crystal layer is greater than a width of any one of the hollow sections of another hollow group far away from the boundary between the frame glue layer and the liquid crystal layer.

In the display panel of the present application, wherein in any one of the hollow groups comprising at least two hollow sections, widths of the hollow sections are the same.

In the display panel of the present application, wherein the number of the hollow groups is two, a width of the hollow section of the hollow group near the boundary between the frame glue layer and the liquid crystal layer is equal to a width of each of the metal wires.

In the display panel of the present application, wherein the hollow group near the boundary between the frame glue layer and the liquid crystal layer includes one hollow section, two metal wires disposed at two sides of the hollow section are disposed in the packaging region and in the frame glue region, respectively.

In the display panel of the present application, wherein the number of the hollow groups is four, a width of the hollow section of the hollow group near the boundary between the frame glue layer and the liquid crystal layer is greater than or equal to 40% of a width of each of the metal wires.

In the display panel of the present application, wherein in any two adjacent hollow sections, a width of one hollow section near the boundary between the frame glue layer and the liquid crystal layer is greater than a width of another hollow section far away from the boundary between the frame glue layer and the liquid crystal layer.

The present application also provides a method for manufacturing a display panel, wherein the display panel comprises a packaging region and a frame glue region adjacent to the packaging region, the method for manufacturing the display panel comprises:

providing a first substrate and forming a driving circuit layer on the first substrate, wherein the driving circuit layer comprises a driving unit sub-layer disposed in the packaging region and a wire sub-layer connected to the driving unit sub-layer and extending to the frame glue region; the wire sub-layer includes a plurality of metal wires disposed parallel to each other, hollow sections are disposed between any two adjacent metal wires;

providing a second substrate, and forming a frame glue layer adjacent to the packaging region on the wire sub-layer, wherein the second substrate is coupled to and fixedly connected to the first substrate by the frame glue, a liquid crystal layer disposed between the first substrate and the second substrate and corresponding to the packaging region; wherein in the hollow sections, a width of each of the hollow sections near a boundary between the frame glue layer and the liquid crystal layer is greater than or equal to a width of each of the other hollow sections.

The method for manufacturing the display panel of the present application, wherein the step of forming a frame glue layer adjacent to the packaging region on the wire sub-layer comprises:

coating a frame glue corresponding to the frame glue region on the wire sub-layer, using ultra violet to irradiate the frame glue through the hollow sections to cure at least a portion of the frame glue t near one side of the packaging area; and employing a heating process to the frame glue to make the frame glue completely cured, and to make a frame glue layer corresponding to the frame glue region on the wire sub-layer.

The beneficial effects of the present application are: by disposing the width of the hollow section near the boundary between the frame glue layer and the liquid crystal layer to be greater than or equal to a width of any one of the hollow sections to ensure the hollowing rate of the boundary between the frame glue layer and the liquid crystal layer, this allows the part of the frame glue layer near one side of the liquid crystal layer to be fully cured, that is, the liquid-sealing layer is well sealed to prevent contamination of the liquid crystal layer. The whole structure has less impact on the original manufacturing process, and is suitable for mass production.

BRIEF DESCRIPTION OF DRAWINGS

In order to more clearly explain the embodiments or the technical solutions in the prior art, the following will briefly introduce the drawings used in the embodiments or the description of the prior art. Obviously, the drawings in the following description are only inventions. Some embodiments, for those of ordinary skill in the art, without paying creative labor, can also obtain other drawings based on these drawings.

FIG. 3 is a flowchart of a method for manufacturing a display panel provided by one embodiment of the present application.

DETAILED DESCRIPTION OF PREFERRED EMBODIMENTS

Figure 1:
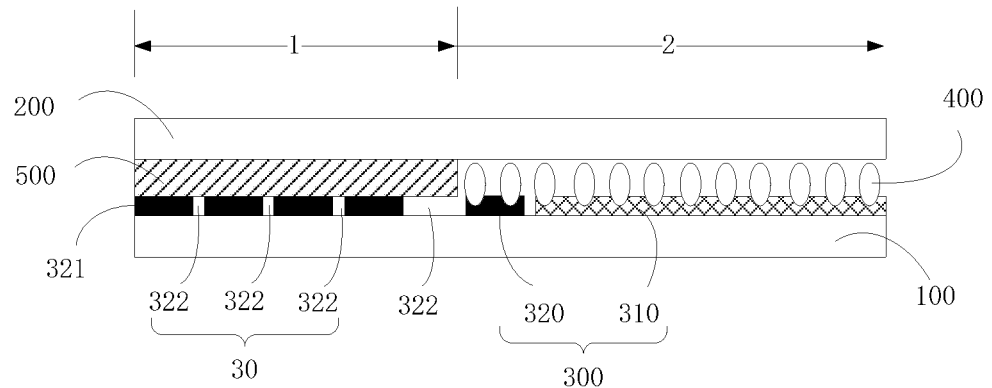
FIG. 1 is a schematic structural diagram of a display panel provided by one embodiment of the present application.

The following description of each embodiment refers to an additional illustration to illustrate specific embodiments that can be implemented in the present application. Directional terms mentioned in this application, such as "upper", "lower", "front", "back", "left", "right", "inner", "outer", "side", etc. are the direction of the schema. Therefore, the directional language used is to illustrate and understand this application, not to limit this application. In the figure, units with similar structures are indicated by the same reference numerals.

In the description of this application, it should be understood that the term "center", "longitudinal", "horizontal", "length", "width", "thickness", "upper", "down", "front", "back", "left", "right", "vertical", "horizontal", "top", "bottom", "inner", "outer", "clockwise", and "anticlockwise" indicates a location or position relations based on the location or position shown in the appended drawings, rather than instructions referred to in or implied devices or components must have a specific location, in a specific orientation structure and operation. Therefore, it cannot be interpreted as a restriction on this application. In addition, the terms "first" and "second" are used for purposes only and cannot be understood to indicate or imply relative importance or to imply the number of technical characteristics indicated. Thus, the characteristics that are defined as "first" or "second" may explicitly or implicitly include one or more of the characteristics. In the description of this application, "multiple" means two or more, unless specifically defined otherwise. In addition, the term "first", "second" is only used for descriptive purposes, and cannot be understood as indicating or implying relative importance or implicitly indicating the number of technical features indicated. Thus, the characteristics that are defined as "first" or "second" may explicitly or implicitly include one or more of the characteristics. In the description of this application, "multiple" means two or more, unless otherwise specifically limited.

In the description of this application, it should be noted that, unless otherwise expressly specified and limited, the terms "installed", "connected" and "connected" shall be understood in a broad sense, for example, as fixed, detachable or one-piece; it can be mechanical, it can be electrical or it can communicate with each other; it can be either directly connected or indirectly connected through an intermediary, or it can be a connection between two elements or an interaction between two elements. For the general technical personnel in this field, the specific meaning of the above terms in this application can be understood according to the specific situation.

In this application, unless otherwise expressly provided and limited, the first feature "above" or "below" the second feature may include direct contact with the first and second features or may include contact with the first and second features not directly but through other features between them. Moreover, the first feature "above", "above" and "above" of the second feature include the first feature directly above and obliquely above the second feature, or simply means that the level of the first feature is higher than that of the second feature. The first feature is "below", "below" and "below" of the second feature, including the first feature directly below and diagonally below the second feature, or simply means that the horizontal height of the first feature is less than that of the second feature.

The following disclosure provides many different implementations or examples for implementing different structures of the present application. In order to simplify the disclosure of the present application, the components and settings of specific examples are described below. Of course, they are merely examples, And the purpose is not to limit this application. In addition, this application may repeat reference numerals and/or reference letters in different examples, such repetition is for the purpose of simplicity and clarity, and does not itself indicate various embodiments and/or discussed relationship between settings. In addition, this application provides examples of various specific processes and materials, but those of ordinary skill in the art may be aware of the application of other processes and/or the use of other materials.

In conjunction with specific embodiments, the technical scheme of the present application is described.

Figure 2:
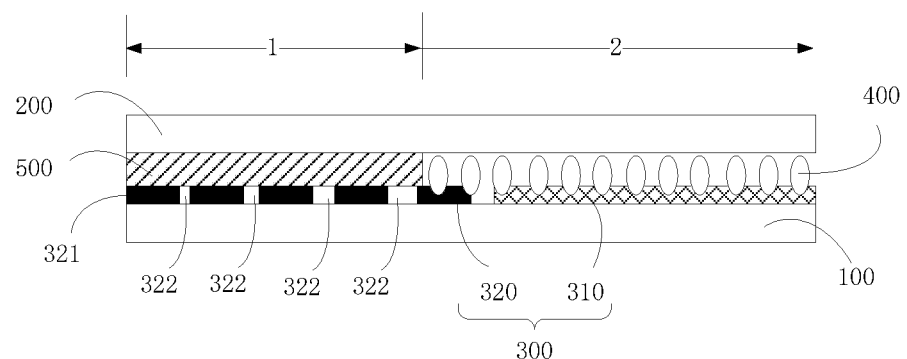
FIG. 2 is another schematic structural diagram of the display panel provided by one embodiment of the present application.

The present application provides a display panel, as shown in FIG. 1 to FIG. 2, including a packaging region 2 and a frame glue region 1 adjacent to the packaging region 2. The display panel includes:

a first substrate 100 and a second substrate 200 disposed opposite to each other;

a driving circuit layer 300 disposed at a side of the first substrate 100 near the second substrate 200, wherein the driving circuit layer 300 includes a driving unit sub-layer 310 disposed in the packaging region 2 and a wire sub-layer 320 connected to the driving unit sub-layer 310 and extending to the frame glue region 320;

a liquid crystal layer 400 disposed between the first substrate 100 and the second substrate 200 and corresponding to the packaging region 2; and a frame glue layer 500 disposed between the wire sub-layer 320 and the second substrate 200 and adjacent to the packaging region 2, wherein the wire sub-layer 320 includes a plurality of metal wires 321 disposed parallel to each other, hollow sections 322 are disposed between any two adjacent metal wires 321, and in the hollow sections 322, a width of each of the hollow sections 322 near a boundary between the frame glue layer 500 and the liquid crystal layer 400 is greater than or equal to a width of each of the other hollow sections 322.

Understandably, for existing display panels, such as 8K 120 HZ with high resolution and high refresh frequency, wires such as clock signal wires in a GOA driving circuit require a greater amount of smaller resistor impedance designed, in a bid to reduce wire heating caused by high frequency operation. Moreover, requirements of narrow borders need to be met, making a layout of clock signal wires (CK) and other wires even tighter. For the existing structure, wire spacing is too narrow, that is, a metal hollow rate is as low as 15%, which causes inability of the frame glue for sealing the liquid crystals to be fully irradiated during UV curing and cured completely, resulting in liquid crystal contamination or poor adhesion of the frame glue. Obviously, in the present application, a width of the hollow sections 322 near a boundary between the frame glue layer 500 and the liquid crystal layer 400 is greater than or equal to a width of each of the other hollow sections 322; that is, one of the hollow section with the maximum width is correspondingly disposed near a boundary between the frame glue layer 500 and the liquid crystal layer 400, thereby improving the hollow section rate of the wire sub-layer 320 correspondingly disposed near a boundary between the frame glue layer 500 and the liquid crystal layer 400, so that one side part of the frame glue layer 500 near the liquid crystal layer 400 when curing the frame glue layer 500 by ultraviolet light is fully cured, thereby realizing a certain packaging effect for the liquid crystal layer 400. Specifically, the hollow rate of the wire sub-layer 320 disposed at a boundary between the frame glue layer 500 and the liquid crystal layer 400 is greater than or equal to 40%, that is, a width of one of the hollow sections 322 with the maximum width among the hollow sections 322 is greater than or equal to 40% of a width of the metal wires 321.

In the present application, the driving circuit layer 300 can be a GOA driving circuit, and a TFT array layer (not shown in the drawing) connected to the driving circuit layer 300 and located in the packaging region 2 is disposed on the first substrate 100. In order to ensure the narrow frame design of the display panel, the frame glue layer 500 is disposed on the wire sub-layer 320, which reduces the requirement for the width of the display panel frame.

It is worth noting that, in the present application, the metal wires 321 are arranged at unequal intervals, and by adjusting the width of the hollow sections 322 at different positions, the hollowing rate of different positions on the wire sub-layer 320 are different. Meanwhile, the hollowed section 322 with the maximum width is correspondingly disposed near a boundary between the frame glue layer 500 and the liquid crystal layer 400, in a bid to ensure one side part of the frame glue layer 500 near the liquid crystal layer 400 when curing the frame glue layer 500 by ultraviolet light is fully cured. In addition, for the part in the frame glue layer 500 that is not fully cured, a heating process is applied in a later stage to gradually cure it.

In one embodiment, wherein the hollow sections 322 are divided into at least two hollow groups 30, each of the hollow groups 30 includes at least one of the hollow sections 322. In any two of the hollow groups 30, a width of any one of the hollow sections 322 in one hollow group 30 near the boundary between the frame glue layer 500 and the liquid crystal layer 400 is greater than a width of any one of the hollow sections 322 in another hollow group 30 far away from the boundary between the frame glue layer 500 and the liquid crystal layer 400. Obviously, the way that the hollow sections 322 are divided into groups results in the different hollow groups 30 having different hollowing rate, that is, in any two of the hollow groups 30, a width of any one of the hollow sections 322 in one hollow group 30 near the boundary between the frame glue layer 500 and the liquid crystal layer 400 is greater than a width of any one of the hollow sections 322 in another hollow group 30 far away from the boundary between the frame glue layer 500 and the liquid crystal layer 400. Therefore, a width of the hollow sections 322 in each of the hollow groups 30 is disposed according to a distance between the hollow groups 30 and the boundary between the frame glue layer 500 and the liquid crystal layer 400, specifically, a width of the hollow sections 322 in the hollow groups 30 closer to the boundary between the frame glue layer 500 and the liquid crystal layer 400 is greater. In addition, in any one of the hollow groups 30 including at least two hollow sections 322, widths of the hollow sections are the same, ensuring that the metal wires 321 in the hollow groups 30 are evenly distributed at equal intervals.

In one embodiment, referring to FIG. 1, a number of the hollow groups 30 is two, wherein a width of each of the hollow sections 322 in one of the hollow groups 30 near the boundary between the frame glue layer 500 and the liquid crystal layer 400 is equal to a width of each of the metal wires 321. Obviously, dividing each of the hollow sections 322 into two hollow groups 30 makes the hollowing rate of the two hollow groups 30 significantly different. The hollowing rate of one of the hollow sections 30 far away from the boundary between the frame glue layer 500 and the liquid crystal layer 400 is lower, that is, each of the metal wires 321 in the hollow groups 30 are closely arranged, so as to reserve a space for another hollow group 30 near the boundary of the frame glue layer 500 and the liquid crystal layer 400, so that a width of all of the hollow sections 322 in the hollow groups 30 is equal to a width of the metal wires 321, and the hollowing rate of the hollow groups 30 is 100%. Of course, a width of the hollow sections 322 in the hollow groups 30 can also be greater than a width of the metal wires 321. Specifically, the hollow group 30 near the boundary between the frame glue layer 500 and the liquid crystal layer 400 includes one hollow section 322, and two of the metal wires 321 disposed at two sides of the hollow section 322 are disposed in the packaging region 2 and in the frame glue region 1, respectively. As the frame glue layer 500 cured by ultraviolet light, the section of the frame glue layer 500 near the liquid crystal layer 400 can be sufficiently irradiated with ultraviolet light, so that faster and complete curing is convenient can be achieved to facilitate encapsulation of the liquid crystal layer 400.

In one embodiment, referring to FIG. 2, a number of the hollow groups 30 is four, wherein a width of each of the hollow sections 322 in one of the hollow groups 30 near the boundary between the frame glue layer 500 and the liquid crystal layer 400 is greater than or equal to 40% of a width of each of the metal wires 321. Thereby, a hollowing rate of the hollow groups 30 near the boundary between frame glue layer 500 and the liquid crystal layer 400 is greater than or equal to 40%. Specifically, the hollowing rate of four hollow groups 30 is 10%, 20%, 30%, and 40% from small to large. Referring to FIG. 2, each of the hollow groups 30 only includes one of the hollow sections 322. Obviously, as an ultraviolet light cures the frame glue layer 500, the ultraviolet light irradiates to the frame glue layer 500 through the hollow sections 322 to cure the frame glue layer 500. During the process, to make sure the frame glue layer 500 is fully irradiated, it is necessary to ensure that the hollowing rate of the wire sub-layer 320 reaches at least 40%. In the present embodiment, a hollowing rate of the hollow groups 30 near a boundary between the frame glue layer 500 and the liquid crystal layer 400 is greater than or equal to 40%. Therefore, one side of the section of the frame glue layer 500 near the liquid crystal layer 400 is completely cured during the ultraviolet curing process. In addition, each of the hollow groups 30 includes a plurality of hollow sections 322, and description thereof shall not be repeated here.

In one embodiment, referring to FIG. 2, in any adjacent two of the hollow sections 322, a width of one of the hollow sections 322 near the boundary between the frame glue layer 500 and the liquid crystal layer 400 is greater than a width of another one of the hollow sections 322 far away from the boundary between the frame glue layer 500 and the liquid crystal layer 400. Specifically, a width of each hollow sections 322 is positively related to a distance from a boundary between the frame glue layer 500 and liquid crystal layer 400, that is, the closer the hollow section 322 is from the boundary between the frame glue layer 500 and the liquid crystal layer 400, the wider the width is, thereby the hollowing rate of the section on the wire sub-layer 320 closer to a boundary between frame glue layer 500 and the liquid crystal layer 400 is greater, so that the section closer to a boundary between the frame glue layer 500 and the liquid crystal layer 400 is cured more completely by ultraviolet light.

In one embodiment, a width of any one of the hollow sections 322 is greater than or equal to 10% of a width of each of the metal wires 321. Specifically, as described above, as the frame glue layer 500 is cured by an ultraviolet light, the ultraviolet light passes through the hollow section 322 and irradiates to the frame glue layer 500 to cure the frame glue layer 500. During the process, in order to ensure at least a certain curing effect, a hollowing rate of the wire sub-layer 320 is at least greater than or equal to 10%, so that after the ultraviolet light goes through each of the hollow sections 322, all of the frame glue layer 500 will have a certain curing effect, while also facilitating following curing operations on sections of the frame glue layer 500 not completely cured by applying a heating process.

In summary, the present application, through setting a width of the hollow sections 322 near the boundary between the frame glue layer 500 and the liquid crystal layer 400 to be greater than or equal to a width of any other hollow sections 322 and ensuring a hollowing rate of the wire sub-layer 320 at a boundary between the frame layer 500 and the liquid crystal layer 400, this allows one side of the section of the frame glue layer 500 near the liquid crystal layer 400 to be fully cured, which allows for good sealing of the liquid-sealing layer and prevents contamination of the liquid crystal layer 400.

The present application also providing a method for manufacturing a display panel, wherein the display panel includes a packaging region 2 and a frame glue region 1 adjacent to the packaging region 2, the method for manufacturing the display panel includes following steps:

A step S10 of providing a first substrate 100 and forming a driving circuit layer 300 on the first substrate, wherein the driving circuit layer 300 includes a driving unit sub-layer 310 disposed in the packaging region 2 and a wire sub-layer 320 connected to the driving unit sub-layer 310 and extending to the frame glue region 1; the wire sub-layer 320 includes a plurality of metal wires 321 disposed parallel to each other, hollow sections 322 are disposed between any two adjacent metal wires 321; and A step S20 of providing a second substrate 200, and forming a frame glue layer 500 adjacent to the packaging region 2 on the wire sub-layer 320, wherein the second substrate 200 is coupled to and fixedly connected to the first substrate 100 by the frame glue layer 500, a liquid crystal layer 400 is disposed between the first substrate 100 and the second substrate 200 and corresponds to the packaging region 2; wherein in the hollow sections 322, a width of each of the hollow sections 322 near a boundary between the frame glue layer 500 and the liquid crystal layer 400 is greater than or equal to a width of each of the other hollow sections 322.

Specifically, in one embodiment, forming the wire sub-layer 320 by fabricating a metal layer on the first substrate 100, and then forming a plurality of the hollow sections 322 on the wire sub-layer 320 by etching. By controlling the etching location, a width of the hollow sections 322 near a boundary between the frame glue layer 500 and the liquid crystal layer 322 is greater than or equal to a width of any other of the hollow sections 322, which facilitates the subsequent curing of one side of the section of the frame glue layer 500 near the liquid crystal layer 400 by ultraviolet light. Obviously, the whole manufacturing flow adopts a more mature process without adding additional procedures, and is suitable for mass production.

In one embodiment, in the step of S20, the step of forming the frame glue layer 500 corresponding to the packaging region 1 on the wire sub-layer includes:

coating a frame glue corresponding to the frame glue region 1 on the wire sub-layer 320, using ultraviolet light to irradiate the frame glue through the hollow sections 322 to cure at least a portion of the frame glue near one side of the packaging region 2; and employing a heating process to the frame glue to make the frame glue completely cured, thereby forming the frame glue layer 500 corresponding to the frame glue region 1 on the wire sub-layer 320.

It can be understood that during the process of using ultraviolet light to irradiate the frame glue, as the hollowing rate of the wire sub-layer near a boundary between the frame glue layer 500 and the liquid crystal layer 400 is greater, it is convenient for fully curing a portion of the frame glue layer 500 near one side of the liquid crystal layer 400. At this time, a portion of the frame glue layer 500 not near the liquid crystal layer 400 corresponds to the location of a lower hollowing rate of the wire sub-layer 320, which makes a portion of the frame glue layer 500 not near the liquid crystal layer 400 partly cured. In the present application, by employing additional heating process, such as baking, etc. to the frame glue to make the frame glue layer 500 completely cured, the requirement for a narrow border of a display panel with extremely high resolution and high refresh frequency, such as 8K 120 HZ can be realized. Meanwhile, packaging of the liquid crystal layer 400 by the frame glue layer 500 can be ensured to prevent abnormal display caused by contamination of the liquid crystal layer 400.

The beneficial effects of the present application are: by disposing a width of the hollow sections 322 near a boundary between the frame glue layer 500 and the liquid crystal layer 400 to be greater than or equal to a width of any one of the hollow sections 322 to ensure a hollowing rate of the wire sub-layer disposed at a boundary between the frame glue layer 500 and the liquid crystal layer 400, this allows the portion of the frame glue layer 500 near one side of the liquid crystal layer 400 to be completely cured, that is, the liquid-sealing layer is well sealed to prevent contamination of the liquid crystal layer. The whole structure has less impact on the original manufacturing process, and is suitable for mass production.

In summary, although the present invention has been disclosed as the preferred embodiments above, the above preferred embodiments are not intended to limit the present invention. Those of ordinary skill in the art can make various changes without departing from the spirit and scope of the present invention. Kinds of changes and retouching, so the protection scope of the present invention is subject to the scope defined by the claims.

What is claimed is:

1. A display panel, comprising a packaging region and a frame glue region adjacent to the packaging region, wherein the display panel comprises:

a first substrate and a second substrate disposed opposite to each other;

a driving circuit layer disposed at a side of the first substrate near the second substrate, wherein the driving circuit layer comprises a driving unit sub-layer disposed in the packaging region and a wire sub-layer connected to the driving unit sub-layer and extending to the frame glue region;

a liquid crystal layer disposed between the first substrate and the second substrate and corresponding to the packaging region; and a frame glue layer disposed between the wire sub-layer and the second substrate and adjacent to the packaging region, wherein the wire sub-layer comprises a plurality of metal wires disposed parallel to each other, hollow sections are disposed between any two adjacent metal wires, and in the hollow sections, a width of each of the hollow sections near a boundary between the frame glue layer and the liquid crystal layer is greater than or equal to a width of each of the other hollow sections; and a width of any one of the hollow sections is greater than or equal to 10% of a width of each of the metal wires.

2. The display panel of claim 1, wherein the hollow sections are divided into at least two hollow groups, each of the hollow groups comprises at least one of the hollow sections, in any two of the hollow groups, a width of any one of the hollow sections in one hollow group near the boundary between the frame glue layer and the liquid crystal layer is greater than a width of any one of the hollow sections in another hollow group far away from the boundary between the frame glue layer and the liquid crystal layer.

3. The display panel of claim 2, wherein in any one of the hollow groups comprising at least two hollow sections, widths of the hollow sections are same.

4. The display panel of claim 3, wherein a number of the hollow groups is two, and a width of each of the hollow sections in one of the hollow groups near the boundary between the frame glue layer and the liquid crystal layer is equal to a width of each of the metal wires.

5. The display panel of claim 4, wherein the hollow group near the boundary between the frame glue layer and the liquid crystal layer comprises one hollow section, and two of the metal wires disposed at two sides of the hollow section are disposed in the packaging region and in the frame glue region, respectively.

6. The display panel of claim 3, wherein a number of the hollow groups is four, and a width of each of the hollow sections in one of the hollow groups near the boundary between the frame glue layer and the liquid crystal layer is greater than or equal to 40% of a width of each of the metal wires.

7. The display panel of claim 1, wherein in any adjacent two of the hollow sections, a width of one of hollow sections near the boundary between the frame glue layer and the liquid crystal layer is greater than a width of another one of the hollow sections far away from the boundary between the frame glue layer and the liquid crystal layer.

8. A display panel comprising a packaging region and a frame glue region adjacent to the packaging region, wherein the display panel comprises:
  a first substrate and a second substrate disposed opposite to each other;
  a driving circuit layer disposed at a side of the first substrate near the second substrate, wherein the driving circuit layer comprises a driving unit sub-layer disposed in the packaging region and a wire sub-layer connected to the driving unit sub-layer and extending to the frame glue region;
  a liquid crystal layer disposed between the first substrate and the second substrate and corresponding to the packaging region; and
  a frame glue layer disposed between the wire sub-layer and the second substrate and adjacent to the packaging region,
  wherein the wire sub-layer comprises a plurality of metal wires disposed parallel to each other, hollow sections are disposed between any two adjacent metal wires, in the hollow sections, a width of each of the hollow sections near a boundary between the frame glue layer and the liquid crystal layer is greater than or equal to a width of each of the other hollow sections, and a width of any one hollow section is greater than or equal to 10% of a width of each of the metal wires; and
  wherein two of the metal wires disposed at two sides of one of the hollow sections closest to the boundary between the frame glue layer and the liquid crystal layer are disposed in the packaging region and in the frame glue region, respectively.

9. The display panel of claim 8, wherein the hollow sections are divided into at least two hollow groups, each of the hollow groups comprises at least one of the hollow sections, and in any two of the hollow groups, a width of any one of the hollow sections of one hollow group near the boundary between the frame glue layer and the liquid crystal layer is greater than a width of any one of the hollow sections of another hollow group far away from the boundary between the frame glue layer and the liquid crystal layer.

10. The display panel of claim 9, wherein in any one of the hollow groups comprising at least two hollow sections, widths of the hollow sections are same.

11. The display panel of claim 10 wherein a number of the hollow groups is two, and a width of the hollow section of the hollow group near the boundary between the frame glue layer and the liquid crystal layer is equal to a width of each of the metal wires.

12. The display panel of claim 10, wherein a number of the hollow groups is four, and a width of the hollow section of the hollow group near the boundary between the frame glue layer and the liquid crystal layer is greater than or equal to 40% of a width of each of the metal wires.

13. The display panel of claim 8, wherein in any two adjacent hollow sections, a width of one hollow section near the boundary between the frame glue layer and the liquid crystal layer is greater than a width of another hollow section far away from the boundary between the frame glue layer and the liquid crystal layer.

14. A method for manufacturing a display panel, wherein the display panel comprises a packaging region and a frame glue region adjacent to the packaging region, the method for manufacturing the display panel comprises following steps:
  providing a first substrate and forming a driving circuit layer on the first substrate, wherein the driving circuit layer comprises a driving unit sub-layer disposed in the packaging region and a wire sub-layer connected to the driving unit sub-layer and extending to the frame glue region, the wire sub-layer comprises a plurality of metal wires disposed parallel to each other, and hollow sections are disposed between any two adjacent metal wires; and
  providing a second substrate, and forming a frame glue layer adjacent to the packaging region on the wire sub-layer, wherein the second substrate is coupled to and fixedly connected to the first substrate by a frame glue, a liquid crystal layer is disposed between the first substrate and the second substrate and corresponds to the packaging region, and in the hollow sections, a width of each of the hollow sections near a boundary between the frame glue layer and the liquid crystal layer is greater than or equal to a width of each of the other hollow sections;
  wherein a width of any one of the hollow sections is greater than or equal to 10% of a width of each of the metal wires.

15. The method for manufacturing the display panel of claim 14, wherein the step of forming the frame glue layer corresponding to the packaging region on the wire sub-layer comprises:
  coating a frame glue corresponding to the frame glue region on the wire sub-layer, using ultraviolet light to irradiate the frame glue through the hollow sections to cure at least a portion of the frame glue near one side of the packaging area; and employing a heating process to the frame glue to make the frame glue completely cured, thereby forming the frame glue layer corresponding to the frame glue region on the wire sub-layer.

* * * * *